United States Patent

Uehling

[15] 3,641,766
[45] Feb. 15, 1972

[54] GAS TURBINE ENGINE CONSTANT SPEED THRUST MODULATION

[72] Inventor: Donald E. Uehling, Cincinnati, Ohio
[73] Assignee: General Electric Company
[22] Filed: Nov. 26, 1969
[21] Appl. No.: 880,136

[52] U.S. Cl.............................60/262, 60/39.66, 60/242, 60/264, 60/271, 239/265.17
[51] Int. Cl.............................................F02k 3/02
[58] Field of Search.............60/262, 264, 39.66, 271, 242; 239/265.17, 127.3

[56] References Cited

UNITED STATES PATENTS

| | | | |
|---|---|---|---|
| 2,597,253 | 5/1952 | Melchior | 60/39.66 |
| 2,703,477 | 3/1955 | Anxionnaz | 60/262 |
| 2,807,137 | 9/1957 | Meulien | 239/265.17 |
| 3,034,298 | 5/1962 | White | 60/39.66 |
| 3,118,276 | 1/1964 | Keenan | 60/262 |
| 3,426,534 | 2/1969 | Murphy | 60/271 |

FOREIGN PATENTS OR APPLICATIONS
1,122,800 5/1956 France.............................60/262

Primary Examiner—Douglas Hart
Attorney—Derek P. Lawrence, Thomas J. Bird, Jr., Lee H. Sachs, Frank L. Neuhauser, Oscar B. Waddell and Joseph B. Forman

[57] ABSTRACT

A device is shown for modulating the thrust output of a gas turbine engine without the necessity of varying the speed of said engine. The device includes means for bypassing a portion of the compressor discharge air to a manifold surrounding the engine tail pipe, and, as required, to the turbine cooling flowpath for the purpose of transiently augmenting turbine cooling flow. The manifold is provided with a plurality of swirl inducing nozzles having inlets in fluidic flow cooperation with the manifold and outlets in fluidic flow cooperation with the tail pipe such that bypass flow is provided to the tail pipe in such a manner as to induce swirl within the main gas stream thereby significantly increasing tail pipe pressure losses and thus reducing thrust output of the engine. Engine speed may be maintained during operation of this device and delay time between increased thrust demand and actual thrust output are thereby lessened.

3 Claims, 7 Drawing Figures

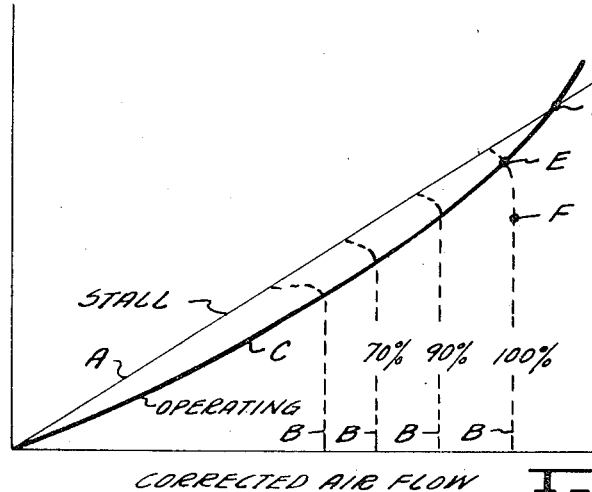
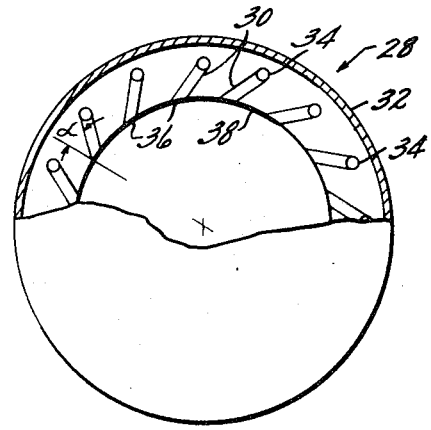
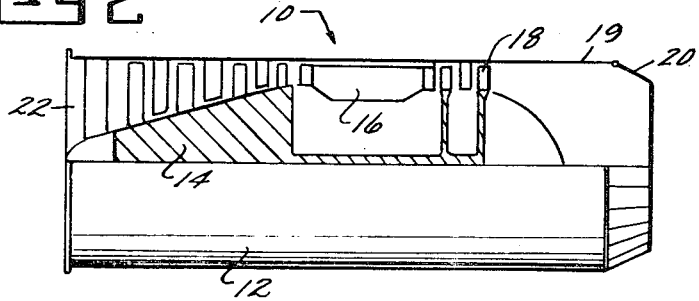
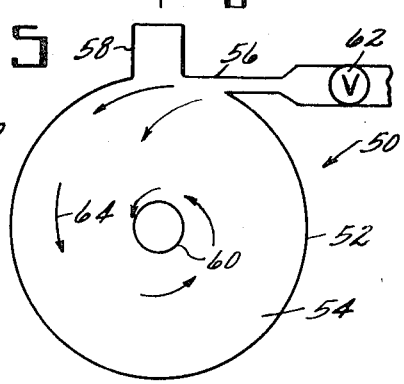
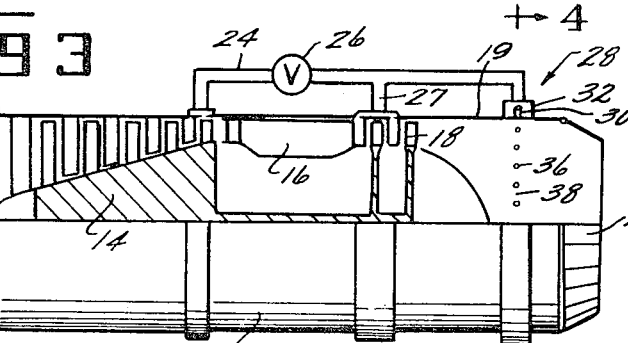
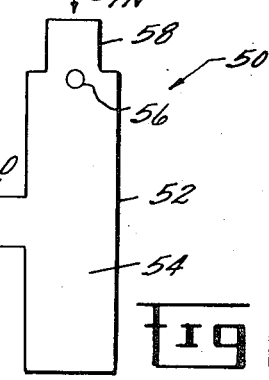
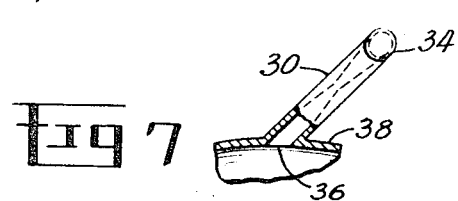
INVENTOR.
DONALD E. UEHLING
BY
Thomas J. Bird, Jr.
AGENT

GAS TURBINE ENGINE CONSTANT SPEED THRUST MODULATION

BACKGROUND OF THE INVENTION

This invention relates generally to gas turbine engines and, more particularly, to apparatus for effectively modulating the thrust output of gas turbine engines.

In modern day high performance gas turbine engines used in the propulsion of aircraft it is extremely desirable to provide engine thrust modulation in the middle to upper end of normal operating thrust ranges with short engine time constants, i.e., short time between thrust demand and actual thrust output. This provision of more rapid thrust response is desired in any number of flight conditions. As one example, faster thrust response is extremely important during instrument waveoff from final landing approach for both commercial and military jet powered aircraft.

Another extremely critical flight condition occurs in military aircraft during an emergency pull out from a carrier landing approach path. This situation requires an extremely rapid availability of full thrust power from the gas turbine engine because a high performance aircraft approaches an aircraft carrier at speeds which are near the minimum at which the aircraft wing will provide lift. In an emergency pull out from the approach path a rapid availability of full power is required to not only avoid loss of lift but to regain maneuverability which essentially is lost in the final moments of a low speed landing approach. In addition, more rapid thrust response is desirable in military aircraft to provide increased tactical maneuverability for air-to-air or air-to-ground combat missions.

With the number of people who utilize air travel increasing almost daily, the need for development of practical vertical or short takeoff or landing (V/STOL) aircraft is also increasing. This type of aircraft generally uses a direct lift and/or lift/cruise engine to provide its needed propulsion. In these types of engines the need for rapid thrust response is extremely critical as the engines provide not only the forward thrust but also the controlling moments about all three basic air vehicle axes.

In presently used gas turbine engine powered aircraft, thrust output is normally scheduled as a function of the position of a pilot controlled throttle lever. Complicated fuel control devices are provided in many engines in an attempt to reduce the time lag between thrust demand and actual thrust output. Reduction of the thrust output is normally accomplished by decreasing fuel supply and reducing the speed of the engine. In present day V/STOL aircraft the problem is normally solved by not relying solely on variable thrust of the main engines but by employing additional reaction control devices, such as air nozzles using turbine engine compression bleed air as their power source, or by using thrust vectoring nozzles or pivoting lift engines. Other solutions include the use of augmented reaction control devices placed at or near the air vehicle extremities. Examples of this are control fans, bleed and burn nozzles, augmented ejectors, etc.

None of the above solutions is, of course, entirely satisfactory in solving the time delay problem. In turbojet engines, the reduction in engine speed which is utilized to partially decrease thrust is probably the greatest cause of time lag between thrust demand and actual thrust output. The addition of additional reaction control devices in V/STOL aircraft, of course, adds undesirable weight and complications to the performance of such aircraft.

SUMMARY OF THE INVENTION

It is an object of the present invention, therefore, to provide a thrust modulator for a gas turbine engine which operates without the necessity of reducing engine speed.

It is a further object of this invention to provide an engine thrust modulator which is capable of use on both straight turbojets and turbofans particularly in direct lift or lift/cruise applications.

Briefly stated, the objects of this invention are carried out by providing a gas turbine engine with a thrust spoiling system which is capable of operation at any engine operating speed. The thrust spoiling system includes a bleed device which is capable of removing a percentage of compressor discharge air and preventing the same from entering the combustion system of the gas turbine engine. Instead of dumping the bleed flow overboard, it is introduced into the exhaust nozzle through a plurality of swirl inducing nozzles in order to significantly increase tail pipe pressure and momentum losses and thereby reduce the nozzle thrust coefficient which causes an instantaneous and additional increment of thrust reduction. It is important to note that, should limiting turbine metal temperatures become a factor, a portion of the aforementioned bleed air would be diverted to the turbine cooling flowpath to transiently augment normal turbine cooling air flow, thereby automatically maintaining acceptable limits of turbine metal temperature during the thrust spoiling mode of operation.

DESCRIPTION OF THE DRAWING

While the specification concludes with a series of claims which particularly point out and distinctly claim the subject matter which the applicant regards as his invention, an understanding of the invention may be gained from the following detailed description of a preferred embodiment which is given in light of the accompanying drawing, in which:

FIG. 1 is a plot of certain compressor relationships commonly known as a compressor map;

FIG. 2 is a schematic view of a simplified gas turbine engine;

FIG. 3 is a schematic view of a gas turbine engine incorporating the swirl inducing nozzles in accordance with this invention; also shown is a parallel bleed air flowpath to augment turbine cooling;

FIG. 4 is a sectional view taken along line 4—4 of FIG. 3;

FIG. 5 is a front sectional view of a common vortex valve;

FIG. 6 is a side sectional view taken along line 6—6 of FIG. 5; and

FIG. 7 is a partial sectional view, with portions removed, of a swirl inducing nozzle constructed in accordance with the present invention.

Referring now to the drawings wherein like numerals correspond to like elements throughout, reference is first made to FIG. 1 which illustrates what is commonly referred to as a compressor map. The relationships illustrated on this compressor map are not intended to relate to any specific compressor but simply illustrate the relationship of certain parameters which are generally applicable to any compressor.

Basically, this compressor map shows the relationship between the pressure rise across the compressor to the corrected mass airflow through the compressor. (Pressure rise is hereinafter referred to as $P_3/P_2$ wherein $P_3$ is the pressure of the air discharged from the compressor and $P_2$ is the pressure of air entering the compressor). A stall line (labeled A on FIG. 1) indicates the minimum airflow through the compressor for any given $P_3/P_2$ value necessary to prevent stall (separation of airflow from a compressor blade). Speed lines (labeled B), representing the corrected rate of rotation of the compressor rotor, illustrate that mass airflow generally increases as speed increases and that higher pressure ratios, and consequently higher energy output levels, are obtained at higher speeds.

In steady state operation, there is a point on any speed line wherein the pressure ratio and mass airflow provides an energy output for maintaining a given thrust output from the engine. A plot of these points results in an operating line for steady state conditions (labeled C). This operating line, as rotor speed increases, eventually intersects the stall line (point D) at what would be the theoretical maximum energy output capability of the compressor. Conventionally, 100 percent engine speed is selected below the maximum energy capability of the compressor to give a margin of safety from stall and to provide a reserve for aircraft maneuverability, other sources of inlet distortion/turbulence and additional short time emergency energy output.

In prior art turbojet or turbofan engines, the speed of the compressor rotor is controlled by regulating fuel flow to the main combustor in order to obtain the actual compressor speed for a desired thrust output. When it is desired to accelerate the engine, an increase in the energy output of the compressor is required and is obtained by increasing the fuel flow to the combustor. For normal operations, such a control system is perfectly satisfactory. There are times, however, when a faster thrust response is highly desirable.

The present invention is designed to provide this faster thrust response upon setting of a thrust demand by the pilot actuated throttle lever. Referring again to FIG. 1, consider the following example: a turbojet or turbofan engine is at rated, 100 percent thrust conditions. At this time, the engine is operating at a point marked E on the compressor map. It is now desired to reduce the thrust output quickly while essentially maintaining 100 percent speed. A portion of the desired thrust reduction is obtained by shifting the engine operating point from point E to point F, also shown on the compressor map. At point F it can be seen that the pressure rise across the compressor had decreased while 100 percent rotor speed has been maintained. Pressure rise across the compressor has decreased because the lower mass flow rate through the combustor and turbine presents less impedance or back pressure as seen by the compressor. This would result in an increment of reduced net thrust output from the engine. Maintenance of the 100 percent rotor inertia, however, would permit restoration to the thrust level of point E to be accomplished most rapidly because the time delay associated with getting the rotor back to full speed is eliminated. The balance of the desired thrust reduction is obtained by the method of disposing of the compressor discharge bleed air, as explained later.

Referring now to FIG. 2, a conventional turbojet engine, designated by the numeral 10, is shown for purposes of explaining this invention. It should be noted that the invention is capable of usage with any gas turbine engine, and is especially adaptable to usage with direct lift or lift/cruise type engines for V/STOL aircraft. As shown in FIG. 2, the turbojet engine 10 comprises a housing 12 which surrounds a compressor 14, a combustion system 16, a turbine 18, a tail pipe 19, and an exhaust nozzle 20. As is generally known, air enters an inlet 22 formed by the housing 12 and is compressed in the compressor 14, ignited along with high energy fuel in the combustion system 16, performs work while expanding through the turbine 18, and finally exits through the exhaust nozzle 20 whereby its high energy provides forward thrust to an aircraft powered by the engine. Both the compressor 14 and the turbine 18 are normally comprised of a number of rows of rotating blades having a cascade of stator vanes interposed between each row of rotating blades. The rotor portion of the turbine 18 is normally connected to the rotor portion of the compressor 14 to drive the same.

As shown schematically in FIG. 3, the turbojet engine 10 is provided with a bypass pipe 24 having a valve 26 interposed therein. One end of the bypass pipe 24 is connected to the compressor 14 near its discharge end, and the valve 26 is actuated by the pilot to bleed off a certain percentage of compressor discharge air thereby reducing the mass flow through the combustion system 16 and the turbine 18. A portion of this bleed air is provided to a turbine cooling flow path 27 from which it is delivered to various components of the turbine 18 to cool the same. It should be pointed out that the bypass pipe 24 is capable of bypassing a much larger percentage of compressor discharge air than is normally used for cooling purposes. This larger bypass flow is equal to approximately 10 percent or more of the total gas flow and is subsequently used for thrust modulating purposes, as will presently be described.

With reference still to FIG. 3, the novel feature of applicant's invention is shown in that the remaining portion of the bleed flow within the pipe 24 is piped from compressor discharge to the turbojet tail pipe 19 forward of the exhaust nozzle 20 and downstream of the turbine 18. The actual mass flow exiting through the exhaust nozzle 20 thus remains nearly constant. If the bleed flow were merely pumped into the tail pipe 19, however, the amount of thrust modulation would be minimal. Applicant therefore pumps the bleed flow through thrust spoiling means, generally designed by the numeral 28, as shown in FIG. 3.

As shown in both FIG. 3 and FIG. 4, the thrust spoiling means 28 take the form of a plurality of swirl inducing nozzles 30 positioned within a manifold 32, to which the bleed pipe 24 is connected. By means of the swirl inducing nozzles 30 the bleed flow is introduced into the tail pipe 19 so as to maximize swirl of the gas flowing within the tail pipe 19, thereby significantly increasing the tail pipe pressure and momentum losses and reducing the nozzle thrust coefficient, which, in turn, causes an instantaneous and additional increment of thrust reduction.

The swirl inducing nozzles 30 are positioned within the manifold 32 such that inlets 34 of the swirl inducing nozzles 30 are in fluidic flow cooperation with the manifold 32 and outlets 36 of the nozzles 30 are in fluidic flow cooperation with the tail pipe 19. As clearly shown in FIG. 4, the swirl inducing nozzles 30 are positioned within the manifold 32 such that the outlets 36 are flush with an inner wall 38 of the tail pipe 19. Because of this, the nozzles 30 cause negligible energy loss to the main exhaust stream when the valve 26 is closed and no bleed flow is being introduced into the tail pipe 19. When the valve 26 is open, however, bleed air flows from the compressor discharge through the pipe 24 to the manifold 32. Air within the manifold 32 is at a pressure close to compressor discharge pressure and is therefore much higher than the pressure of the air within the tail pipe 19. For this reason, the nozzles 30 are formed of convergent-divergent shape as shown in FIG. 7 in order to maximize the velocity of the flow exiting through the outlets 36 thereof.

As shown best in FIG. 4, the swirl nozzles 30 are positioned at an angle $\alpha$, nominally 45° to a radial line extending from the centerline of the engine 10. In this manner the flow exiting through the outlets 36 enters the tail pipe 19 in a manner causing the maximum swirl to be induced within the main exhaust stream flowing within the tail pipe 19. While a nominal angle of 45° has been shown, it should be realized that thrust modulation would be obtained with any angle between 0°–90°. A preferable angle would be between 30°–60°, however. The interaction of the bleed flow from the outlets 36 and the main airflow stream from the turbine 18 creates a controlled vortex which significantly increases tail pipe pressure and momentum losses and reduces the exhaust nozzle thrust coefficient thus causing an instantaneous increment of thrust reduction whenever the valve 26 is opened.

The interaction of the streams of the swirl inducing nozzles 30 on the main gas stream is roughly analogous to the action of a fluidic vortex valve control stream on the vortex supply flow. For this reason, reference is now made to FIGS. 5 and 6 wherein a standard vortex valve 50 is shown. As shown therein, the vortex valve 50 comprises a housing 52 having a swirl chamber 54 provided with a tangential inlet or control port 56, a radial inlet port 58 and an axial outlet port 60. The port 56 is connected to a control flow, and the ports 58 and 60 are interposed in a liquid or gas flow system in such a manner that the magnitude of the vortex created by the control flow into the vortex chamber 54 through the port 56 will affect the amount of pressure drop (and thereby flow) between the inlet port 58 and the outlet port 60.

In more detail, the operation of the vortex chamber 54 is as follows: when the control flow is shut off, as by a valve 62, fluid enters the swirl chamber 54 through the inlet port 58 and leaves through the outlet port 60 with little or no effect being caused by the swirl chamber 54. When the control valve 62 is open, however, a vortex (shown generally by arrows 64) is induced in the swirl chamber 54 which effectively creates a centrifugal force or pressure to counter the main inlet pressure at the inlet port 58, thus reducing or stopping the main flow through the outlet port 60.

Referring back to FIGS. 3 and 4, it can be seen that the tail pipe 19 is roughly analogous to the swirl chamber 54 and the swirl inducing nozzles 30 are analogous to the control port 56. The exhaust nozzle 20, located downstream of the swirl inducing nozzles 30, is analogous to the outlet port 60. Thus, when control flow enters the tail pipe 19 through the swirl inducing nozzles 30, the controlled vortex created causes both momentum and pressure losses at the exhaust nozzle 20. The amount of thrust output associated with the engine 10 is thereby effectively reduced.

In operation, the thrust modulation system works as follows: whenever full thrust output from the engine 10 is desired the pilot sets the throttle at a certain level with the bleed valve 26 closed. At this time the engine 10 would be operating at point E (FIG. 1). When reduced thrust is desired the pilot directly or indirectly causes valve 26 to open, either completely or partially, as required. Bypass flow through the pipe 24 thus passes into the manifold 32 and through the swirl inducing nozzles 30 into the tail pipe 19. Flow also occurs through the turbine cooling flowpath 27 as required to automatically limit turbine temperatures to safe values. High energy losses are thus induced in the tail pipe 19 and the thrust output declines. The engine 10 is now operating at point F. When higher thrust is needed the pilot merely causes the closing of valve 26 thus preventing further bypass flow to the manifold 32. Because engine speed has been maintained at 100 percent throughout, the new thrust level is obtained almost instantaneously.

The above-described system is thus capable of thrust modulation without the necessity for changing the rotor speed of the compressor 14 and the turbine 18. It is recognized that the reduction in flow across the turbine 18 plus the reintroduction of the bleed air downstream of the turbine 18 will significantly increase the cycle turbine inlet temperature required to maintain engine speed. Should the turbine components be incapable of taking this transient increase in cycle temperature, even with the automatically supplied additional increment of turbine cooling air through flowpath 27, a coincident increase in exhaust nozzle area would be needed. For this reason, the exhaust nozzle 20 would desirably be of the variable area type.

While rapid restoration of thrust can be obtained by simply shutting off the valve 26 and thereby eliminating the bleed flow used to provide tail pipe swirl. If the exhaust nozzle area has been increased, the area would also have to be returned to its rated value. The time delay normally associated with thrust modulation, even in the case where exhaust nozzle area is varied, is effectively minimized because the time delay associated with bringing the engine speed back to normal is eliminated.

While a preferred embodiment of applicant's invention has been shown and described it should be obvious that certain changes could be made without departing from the broader aspects of applicant's device. For example, in some applications, it may be found that the plurality of swirl inducing nozzles 30 could be replaced with a single nozzle or with one per quarter sector, etc. While the above descriptions have been limited to an engine operating at 100 percent speed, it should also be obvious that the device would be capable of operation at any other operating speed. For these reasons, the appended claims are intended to cover the broad aspects of applicant's invention.

What is claimed as new and desired to be secured by Letters Patent of the United States is:

1. In a gas turbine engine comprising a compressor, a combustion system, a turbine, a tail pipe, and a variable area exhaust nozzle, a device for modulating the thrust output of said engine and for transiently augmenting turbine cooling air flow without the necessity of varying the speed of said engine, said device comprising:

a manifold surrounding at least a portion of said tail pipe;

a plurality of swirl inducing nozzles located in said manifold, said nozzles having inlets which lie in fluidic flow cooperation with said manifold and outlets in fluidic flow cooperation with said tail pipe, said outlets being flush with the inner wall of said tail pipe, said nozzles being disposed at an angle to a radial line extending from the centerline of said engine such that flow from said manifold through said nozzles is delivered to said tail pipe in a manner to maximize pressure and momentum losses in said tail pipe;

a turbine cooling flow path;

means for bypassing a substantial portion of compressor discharge air to said manifold and to said turbine cooling flow path; and means for varying the amount of bypass flow delivered to said manifold and to said turbine cooling flow path, whereby the thrust output of said engine may be varied while the speed of rotation of said turbine remains substantially constant.

2. A thrust modulating device as recited in claim 1 wherein said substantial portion of compressor discharge air comprises at least 10 percent of said compressor discharge air.

3. A thrust modulating device as recited in claim 2 wherein one or more of said swirl inducing nozzles are of the converging-diverging type.

* * * * *